(12) United States Patent
Watanabe

(10) Patent No.: US 7,652,743 B2
(45) Date of Patent: Jan. 26, 2010

(54) LIQUID CRYSTAL DISPLAY ELEMENT

(75) Inventor: Noriko Watanabe, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 262 days.

(21) Appl. No.: 11/814,292

(22) PCT Filed: Jan. 17, 2006

(86) PCT No.: PCT/JP2006/300556

§ 371 (c)(1),
(2), (4) Date: Jul. 19, 2007

(87) PCT Pub. No.: WO2006/077838

PCT Pub. Date: Jul. 27, 2006

(65) Prior Publication Data

US 2009/0046239 A1 Feb. 19, 2009

(30) Foreign Application Priority Data

Jan. 20, 2005 (JP) ............................. 2005-013337

(51) Int. Cl.
*G02F 1/1339* (2006.01)
(52) U.S. Cl. .................... 349/156; 349/155; 349/157
(58) Field of Classification Search .......... 349/155–157
See application file for complete search history.

(56) References Cited

U.S. PATENT DOCUMENTS

| | | | |
|---|---|---|---|
| 4,983,023 | A | 1/1991 | Nakagawa et al. |
| 2003/0025868 | A1 | 2/2003 | Hiroshima et al. |
| 2003/0112405 | A1 * | 6/2003 | Kim et al. .................... 349/156 |
| 2004/0021819 | A1 | 2/2004 | Kadotani |
| 2004/0150782 | A1 | 8/2004 | Honda et al. |
| 2006/0103803 | A1 * | 5/2006 | Jeon et al. .................... 349/155 |

FOREIGN PATENT DOCUMENTS

| | | |
|---|---|---|
| JP | 2000-227598 A | 8/2000 |
| JP | 2000-338503 A | 12/2000 |
| JP | 2003-161949 A | 6/2003 |
| JP | 2003-279998 A | 10/2003 |
| JP | 2004-212742 A | 7/2004 |

OTHER PUBLICATIONS

Official Communication for PCT Application No. PCT/JP2006/300556; mailed on Apr. 25, 2006.

* cited by examiner

*Primary Examiner*—Richard H Kim
(74) *Attorney, Agent, or Firm*—Keating & Bennett, LLP

(57) ABSTRACT

A liquid crystal display element includes two substrates divided into a display region and a non-display region, between which liquid crystals are sandwiched, and first columnar spacers, disposed between the two substrates in the display region, which make contact with the two substrates. The liquid crystal display element also includes second columnar spacers, disposed between the two substrates in the non-display region, which make contact with the two substrate by a contact area that is smaller than a contact area by which the first columnar spacers make contact with the two substrates. Therefore, generation of vacuum bubbles in the display region due to a temperature drop or a substrate deformation causes the substrates in the non-display region to be concaved, so that the liquid crystals move from the concaved portion of the non-display region to a portion of the display region which contains the vacuum bubbles. As a result, the vacuum bubbles in the display region can be filled with the liquid crystals, so that the vacuum bubbles can be eliminated from the display region.

7 Claims, 10 Drawing Sheets

F I G. 2
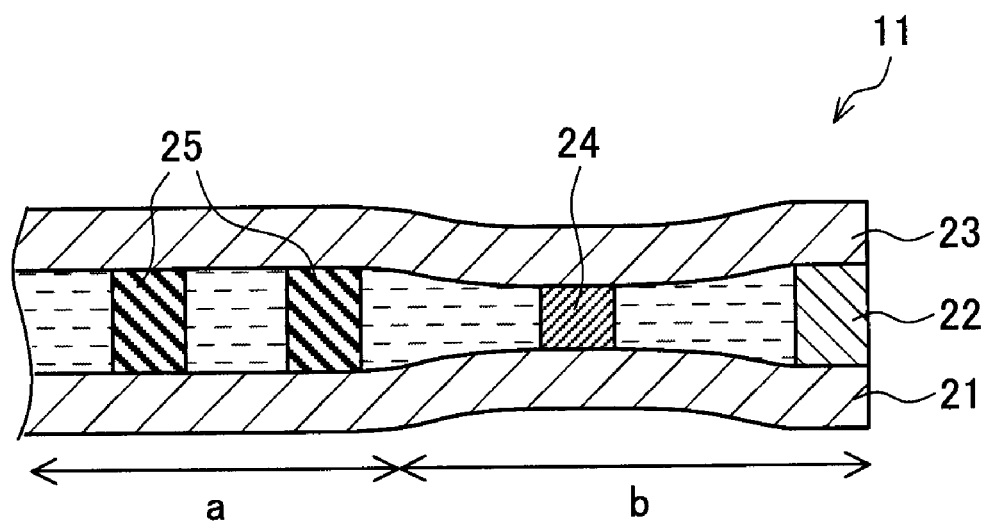

F I G. 6
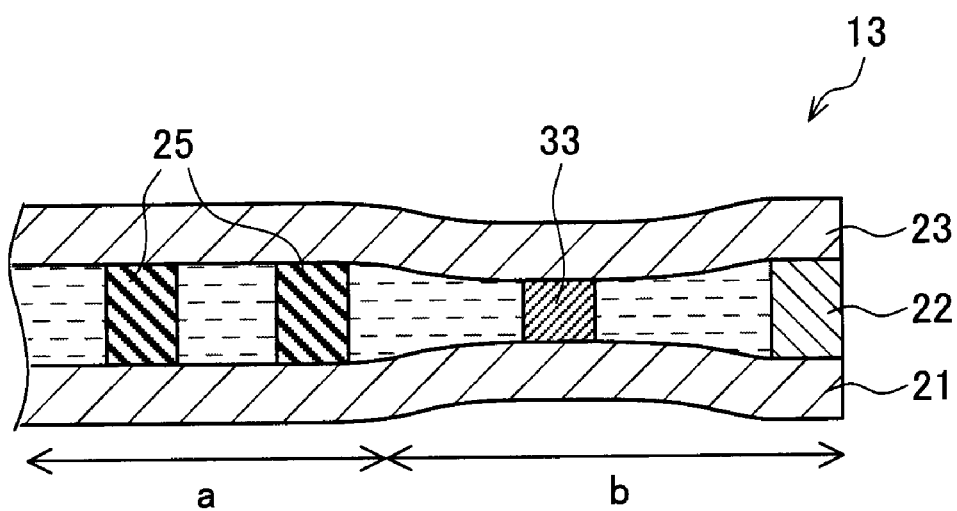

LIQUID CRYSTAL DISPLAY ELEMENT

BACKGROUND OF THE INVENTION

1. Field of the Invention

The present invention relates to a liquid crystal display element that displays an image with use of liquid crystals sandwiched between substrates.

2. Description of the Related Art

As shown in FIGS. 12(a) and 12(b), a liquid crystal display element 101 constituting a conventional panel includes (i) two substrates (a lower substrate 121 and an upper substrate 123) divided into a display region a and a non-display region b and (ii) first columnar spacers 125, disposed between the substrates both in the display region a and the non-display region b, which make contact with the two substrates. Sandwiched between the two substrates are liquid crystals 126, and the liquid crystals 126 are sealed in with sealing material 122.

A liquid crystal panel manufactured with the use of flexible substrates such as plastic substrates needs columnar spacers in order to obtain a predetermined cell gap, uniformity, and resistance to pressure. Flexible substrates may have warpage or undulation; therefore, when such substrates are joined to each other, it is necessary to harden a seal with the substrates made sufficiently flat under pressure. For this reason, highly pressure-resistant columnar spacers are used instead of conventionally commonly-used spherical bead spacers. As shown in FIG. 12(a), the columnar spacers of a predetermined size are provided across the whole panel. This makes it possible to obtain a liquid crystal panel that has a uniform cell gap across the whole panel. In cases where a liquid crystal panel manufactured with the use of flexible substrates is subjected to external pressure due to pen-based input or the like, the flexible substrates are, unlike glass substrates, easily deformed at the portion to which force is applied. Therefore, it is preferable that the columnar spacers withstand external pressure and have high rigidity or high elasticity.

Conventional panels are disclosed in Patent Documents 1 to 6 listed below.

Patent Document 1: Japanese Unexamined Patent Application No. 96626/1989 (Tokukaihei 1-96626; published on Jan. 14, 1989)

Patent Document 2: Japanese Unexamined Patent Application No. 338503/2000 (Tokukai 2000-338503; published on Dec. 8, 2000)

Patent Document 3: Japanese Unexamined Patent Application No. 62038/2004 (Tokukai 2004-62038; published on Feb. 26, 2004)

Patent Document 4: Japanese Unexamined Patent Application No. 279998/2003 (Tokukai 2003-279998; published on Oct. 2, 2003)

Patent Document 5: Japanese Unexamined Patent Application No. 212741/2004 (Tokukai 2004-212741; published on Jul. 29, 2004)

Patent Document 6: Japanese Unexamined Patent Application No. 212742/2004 (Tokukai 2004-212742; published on Jul. 29, 2004)

However, such a panel has another problem in terms of reliability. In cases where the panel is left at low temperatures, the volume of the liquid crystals is reduced. However, the substrates between which the cell gap is controlled with the columnar spacers cannot be deformed. Therefore, the capacity of the panel cannot keep pace with a change in the volume of the liquid crystals. This causes generation of regions free of liquid crystals (such regions being hereinafter referred to as "vacuum bubbles"). Further, the same is equally true of a case where the panel is subjected to large external force. For example, in cases where one of the substrates is subjected to force that pulls the substrate away from the liquid crystals (outward), the substrate expands and contracts to such an extent that the capacity of the panel is increased. However, the volume of the liquid crystals cannot keep pace, with the result that vacuum bubbles are generated.

According to Patent Document 1 (Japanese Unexamined Patent Application No. 96626/1989 (Tokukaihei 1-96626; published on Jan. 14, 1989)) (i) spherical spacers having high rigidity and (ii) spherical spacers having low rigidity and a small modulus of elasticity are used. The spherical spacers (ii) have a larger diameter, and are more easily deformed, than the spherical spacers (i). With this, the capacity of the panel can keep pace with a change caused in the volume of the liquid crystals in accordance with a change of temperature.

However, in such a structure, the cell gap in the display region is easily changed due to external pressure or the like. This increases the likelihood of a display defect.

According to Patent Document 2 (Japanese Unexamined Patent Application No. 338503/2000 (Tokukai 2000-338503; published on Dec. 8, 2000)), a spacer body constituted by a plurality of columnar spacers of different heights is provided. The spacer body has a high portion that is easily deformed. This makes it possible to obtain a highly pressure-resistant liquid crystal display element.

However, in such a structure, the cell gap is determined when the high portion of the spacer body has been crushed at the time of joining the substrates to each other. Therefore, the cell gap in the display region, where the capacity of the panel cannot keep pace with a change caused in the volume of the liquid crystals in accordance with a subsequent change of temperature, is easily changed due to external pressure or the like. This increases the likelihood of a display defect.

According to Patent Document 3 (Japanese Unexamined Patent Application No. 62038/2004 (Tokukai 2004-62038; published on Feb. 26, 2004)), no spacers are provided in the non-display region.

However, the use of flexible substrates in this structure causes such a problem that the formation of a vacuum in the panel for the purpose of injecting liquid crystals into the space between the substrates causes the cell gap to collapse, with the result that the liquid crystals are not injected into the space between the substrates.

According to Patent Document 4 (Japanese Unexamined Patent Application No. 279998/2003 (Tokukai 2003-279998; published on Oct. 2, 2003)), the display region and the non-display region have different densities of distribution of columnar spacers.

In this structure, the size of the spacers provided in the display region is equal to the size of the spacers provided in the non-display region; that is, the contact area by which each spacer provided in the display region makes contact with the substrates is equal to the contact area by which each spacer provided in the non-display region makes contact with the substrates, and the display region and the non-display region have different densities of distribution of spacers. Because all the spacers have the same rigidity, the spacer portion is not deformed even under external pressure. Because the spacers are subjected to high pressure, the surfaces of the substrates are damaged in cases where the spacers are harder than the surfaces of the substrates and the spacers are crushed in cases where the surfaces of the substrates are harder than the spacers.

According to Patent Document 5 (Japanese Unexamined Patent Application No. 212741/2004 (Tokukai 2004-212741; published on Jul. 29, 2004)), the columnar spacers provided in the non-display region is lower by 0 to 0.8 μm in height than those provided in the display region.

Because the substrate provided with the columnar spacers has a thick protective layer in the non-display region, the level of an upper surface of each of the columnar spacers provided in the non-display region is made higher than the level of an upper surface of each of the columnar spacers provided in the display region. Therefore, when the height of the spacers provided in the display region is equal to the height of the spacers provided in the non-display region, the substrates are deformed when the substrates are joined to each other. The columnar spacers provided in the non-display region are reduced in height for the purpose of preventing the substrates from being deformed. According to this arrangement, the substrates cannot be deformed in accordance with a change in the volume of the liquid crystals for the following reasons (1) to (3):

(1) The columnar spacers provided in the non-display region and the columnar spacers provided in the display region are in contact with the substrates at a point of time where the substrates are joined to each other;

(2) The columnar spacers provided in the non-display region have the same rigidity as do those provided in the display region; and (3) It cannot be expected that the non-display region is arranged so as to be easily deformed than the display region (A black matrix usually has a protective layer with high rigidity).

According to Patent Document 6 (Japanese Unexamined Patent Application No. 212742/2004 (Tokukai 2004-212742; published on Jul. 29, 2004)), the area of an upper surface of each of the columnar spacers provided in the non-display region is made smaller than the area of an upper surface of each of the columnar spacers provided in the display region. Because the substrate provided with columnar spacers has a thick protective layer in the non-display region, the level of an upper surface of each of the columnar spacers provided in the non-display region is made higher than the level of an upper surface of each of the columnar spacers provided in the display region. When this substrate is joined to another substrate, the columnar spacers provided in the non-display region are deformed, with the result that a uniform cell gap is obtained.

The columnar spacers provided in the non-display region are not further deformed, and therefore cannot keep pace with a change in the volume of the liquid crystals or the like.

SUMMARY OF THE INVENTION

In order to overcome the problems described above, preferred embodiments of the present invention provide a liquid crystal display element which, even in case of a temperature drop or a substrate deformation, can prevent the reliability of a panel from being degraded due to vacuum bubbles.

In order to solve the foregoing problems, a liquid crystal display element according to a preferred embodiment of the present invention includes (i) two substrates, divided into a display area and a non-display area, between which liquid crystals are sandwiched and (ii) first columnar spacers, disposed between the two substrates in the display region, which make contact with the two substrates, the liquid crystal display element including: second columnar spacers, disposed between the two substrates in the non-display region, which make contact with the two substrates by a contact area smaller than a contact area by which the first columnar spacers make contact with the two substrates.

According to the foregoing arrangement, the second spacers disposed between the two substrates in the non-display region make contact with the two substrates by a contact area smaller than a contact area by which the first columnar spacers disposed between the two substrates in the display region make contact with the two substrates. As a result, even in an identical environment, the non-display region is more easily concaved than the display region due to an external factor. Therefore, when a temperature drop or a substrate deformation is caused in the display region, the substrates in the non-display region are concaved, so that the liquid crystals move into the display region by the capacity by which the non-display region was concaved. As a result, the display region can be filled with the liquid crystals. This makes it possible to prevent vacuum bubbles from being generated in the display region. This brings about an effect of making it possible to, even in case of a temperature drop or a substrate deformation, prevent the reliability of a panel from being degraded due to vacuum bubbles.

Further, a liquid crystal display element according to a preferred embodiment of the present invention includes (i) two substrates, divided into a display area and a non-display area, between which liquid crystals are sandwiched and (ii) first columnar spacers, disposed between the two substrates in the display region, which make contact with the two substrates, the liquid crystal display element including: second columnar spacers, disposed between the two substrates in the non-display region, which make contact with only one of the two substrates.

According to the foregoing arrangement, the second columnar spacers disposed between the two substrates in the non-display region make contact with only one of the two substrates. That is, the space between the substrates in the display region is kept by the first columnar spacers; however, one of the substrates in the non-display region floats since it does not make contact with the second columnar spacers. As a result, even in an identical environment, the non-display region is more easily concaved than the display region due to an external factor. Therefore, when a temperature drop or a substrate deformation is caused in the display region, the substrates in the non-display region are concaved, so that the liquid crystals move into the display region by the capacity by which the non-display region was concaved. As a result, the display region can be filled with the liquid crystals. This makes it possible to prevent vacuum bubbles from being generated in the display region. This brings about an effect of making it possible to, even in case of a temperature drop or a substrate deformation, prevent the reliability of a panel from being degraded due to vacuum bubbles.

Further, a liquid crystal display element according to a preferred embodiment of the present invention includes (i) two substrates, divided into a display area and a non-display area, between which liquid crystals are sandwiched and (ii) first columnar spacers, disposed between the two substrates in the display region, which make contact with the two substrates, the liquid crystal display element including: spherical spacers, disposed between the two substrates in the non-display region, which makes contact with the two substrates.

According to the foregoing arrangement, the spherical spacers disposed between the substrates in the non-display region make contact with the two substrates. Generally, the spherical spacers are easily concaved than the columnar spacers. As a result, even in an identical environment, the non-display region is more easily concaved than the display region due to an external factor. Therefore, when a temperature drop or a substrate deformation is caused in the display region, the substrates in the non-display region are concaved, so that the liquid crystals move into the display region by the capacity by which the non-display region was concaved. As a result, the display region can be filled with the liquid crystals. This makes it possible to prevent vacuum bubbles from being generated in the display region. This brings about an effect of making it possible to, even in case of a temperature drop or a substrate deformation, prevent the reliability of a panel from being degraded due to vacuum bubbles.

Additional elements, characteristics, steps, features, and strengths of the present invention will be made clear by the description below. Further, the advantages of the present invention will be evident from the following explanation in reference to the drawings.

BRIEF DESCRIPTION OF THE DRAWINGS

FIG. 2 is a cross-sectional view showing what the liquid crystal display element looks like when the non-display region is concave.

FIG. 6 is a cross-sectional view showing what the liquid crystal display element looks like when the non-display region is concave.

DETAILED DESCRIPTION OF PREFERRED EMBODIMENTS

According to such a structure as described below, the substrates in the non-display region serving as a region other than the display region are easily deformed. This makes it possible to handle a change in the volume of the liquid crystals or in the capacity of the panel.

Figure 1:
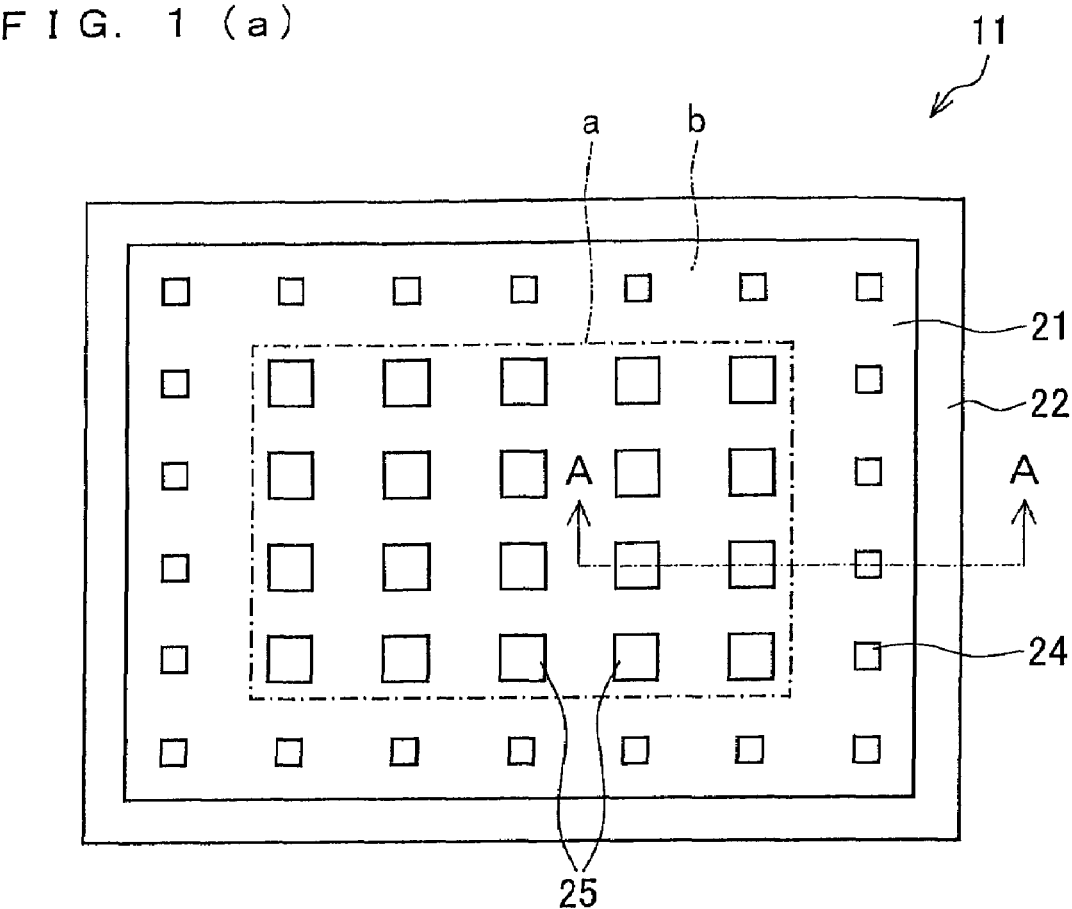
FIG. 1(a) is a plan view showing an example arrangement of a liquid crystal display element according to a preferred embodiment of the present invention.
FIG. 1(b) is a cross-sectional view of the liquid crystal display element of FIG. 1(a) taken along the line A-A.
Figure 1:
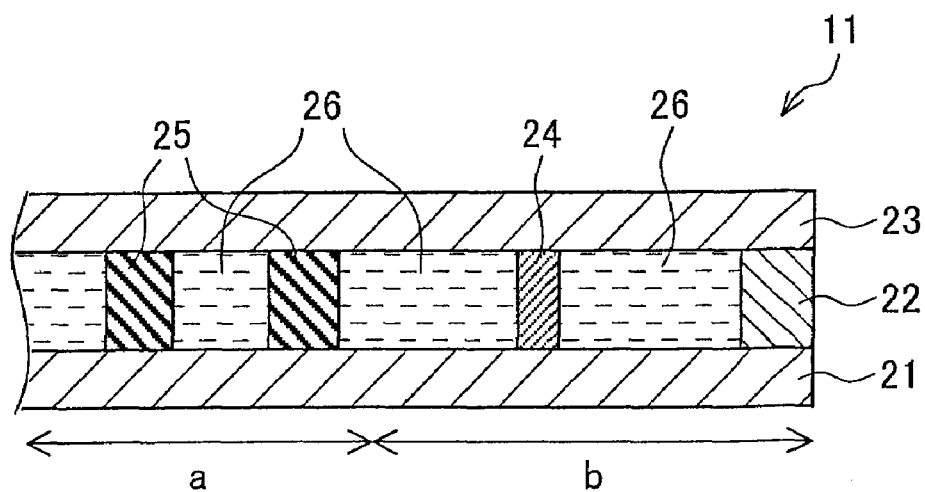

As shown in FIGS. 1(a) and 1(b), a liquid crystal display element 11 constituting a panel includes (i) two substrates (a lower substrate 21 and an upper substrate 23) divided into a display region a and a non-display region b and (ii) first columnar spacers 25, disposed between the two substrates in the display region a, which make contact with the two substrates. Sandwiched between the two substrates are liquid crystals 26, and the liquid crystals 26 are sealed in with sealing material 22.

Furthermore, second columnar spacers 24 are provided in the non-display region. Each of the second columnar spacers 24 has a smaller area of base than each of the first columnar spacers 25 does.

According to such an arrangement as shown in FIGS. 1(a) and 1(b), the contact area by which the second columnar spacers 24 make contact with one (the upper substrate 23 of FIG. 1(b)) of the substrates and the other one (the lower substrate 21 of FIG. 1(b)) of the substrates is smaller than the contact area by which the first columnar spacers 25 make contact with these substrates. For this reason, the second columnar spacers 24 receive higher pressure from the substrates than the first columnar spacers 25 do from the substrates. Consequently, the second columnar spacers 24 more easily contract when pressed than the first columnar spacers 25. Therefore, as shown in FIG. 2, the non-display region b is more easily concaved than the display region a.

Figure 3:
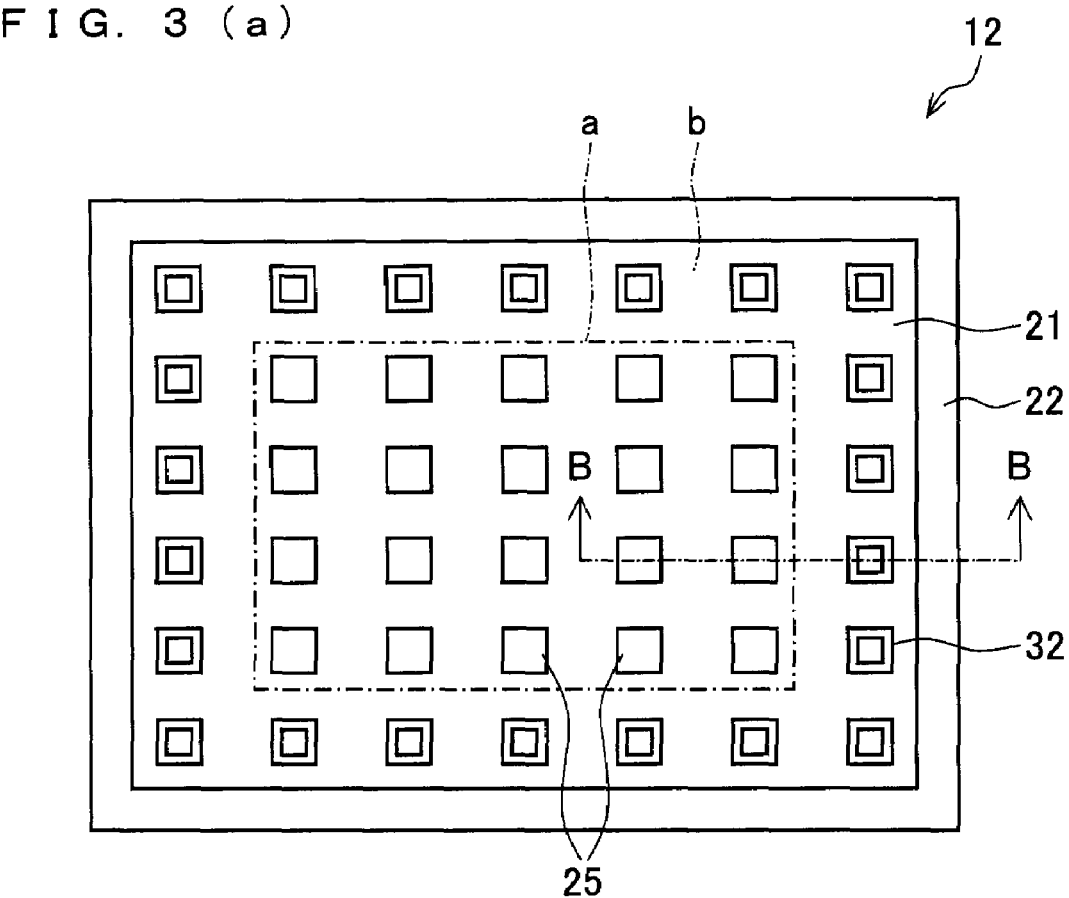
FIG. 3(a) is a plan view showing an example arrangement of a liquid crystal display element according to a preferred embodiment of the present invention.
FIG. 3(b) is a cross-sectional view of the liquid crystal display element of FIG. 3(a) taken along the line B-B.
Figure 3:
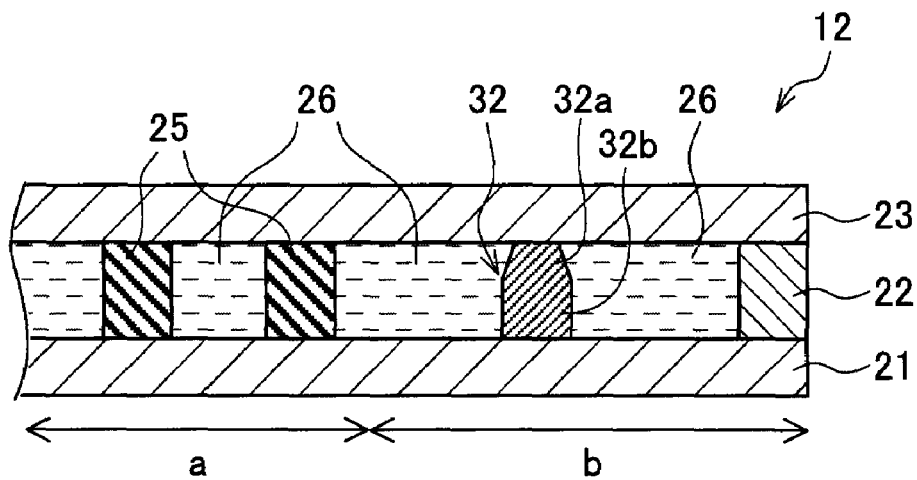

The following shows another example arrangement. As shown in FIGS. 3(a) and 3(b), a liquid crystal display element 12 constituting a panel, as with FIGS. 1(a) and 1(b), includes (i) two substrates (a lower substrate 21 and an upper substrate 23) divided into a display region a and a non-display region b and (ii) first columnar spacers 25, disposed between the two substrates in the display region a, which make contact with the two substrates. Sandwiched between the two substrates are liquid crystals 26, and the liquid crystals 26 are sealed in with sealing material 22.

Furthermore, second columnar spacers 32 are provided in the non-display region b. Each of the second columnar spacers 32 has an end portion 32a, i.e., an upper surface, and a main-body portion 32b. The end portion 32a has a smaller cross-sectional area than the main-body portion 32b does.

Figure 4:
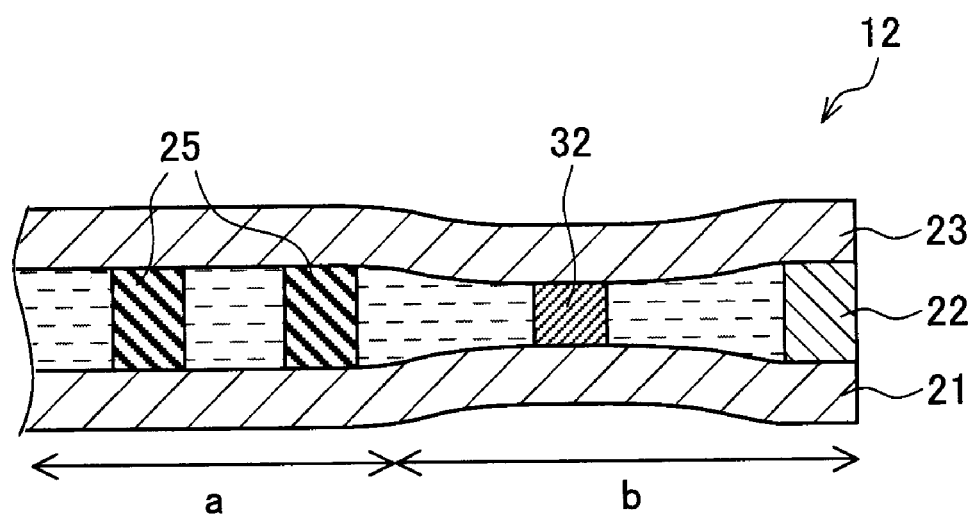
FIG. 4 is a cross-sectional view showing what the liquid crystal display element looks like when the non-display region is concaved.

According to such an arrangement as shown in FIGS. 3(a) and 3(b), the contact area by which one (the upper substrate 23 of FIG. 3(b)) of the substrates is contacted is smaller than the contact area by which the other one (the lower substrate 21 of FIG. 3(b)) of the substrates. For this reason, the end portions 32a of the second columnar spacers 24 receive higher pressure from the substrates than the first columnar spacers 25 do from the substrates. Consequently, the second columnar spacers 24 more easily contract when pressed than the first columnar spacers 25. Therefore, as shown in FIG. 4, the non-display region b is more easily concaved than the display region a.

As shown in FIGS. 3(a) and 3(b), each of the second columnar spacers 32 has the same area of base as each of the first columnar spacers 25 does, and is shaped differently from the first columnar spacer 25 into a dome, a pyramid, or the like so as to have a smaller upper-surface area than the first columnar spacer 25 does. Such second columnar spacers 25 can be formed by appropriately using publicly-known methods.

Commonly-used examples of spacer material include negative photosensitive material (whose portion that is exposed to light is left). In cases where a spacer pattern is formed by exposure via a photomask, the first columnar spacers can be each shaped into an angular column or a cylindrical column with use of parallel light, and the second columnar spacers 32 can be each shaped into a pyramid or a cone by making use of a wraparound of diffusion light.

A dome and a pyramid are both a shape whose base is wider than its upper surface, and differ from each other only in that whereas the dome has a round base, the pyramid has a square base. Note that the second columnar spacers 25 may be each shaped so as to have a base of another shape.

As shown in FIGS. 3(a) and 3(b), only an upper base of each of the second columnar spacers 32 is tapered. However, each of the second columnar spacers 32 may be arranged such that both bases thereof are tapered (both ends thereof are tapered and a central portion thereof is thick). Such a structure is made possible by using positive photosensitive material (whose portion that is protected from light is left) as spacer material and by exposing the positive photosensitive material to light so that the light wraps around from both sides of the substrate.

According to the arrangement shown FIGS. 1(a) and 1(b) or in FIGS. 3(a) and 3(b), even in cases where the level of the base of the non-display region is higher than the level of the base of the display region, the upper surface of each of the second columnar spacers 24 or 32 serving as spacers in the non-display region is not crushed when the substrates are joined to each other.

That is, the cell gap of the non-display region b is equal to or greater than the height of the second columnar spacers 24 or 32. The term "cell gap" refers to a "space between substrates".

That is, the height of the second columnar spacers 24 or 32 may be less than the cell gap of the non-display region b. In such a case, the same is equally true of a case (where the second columnar spacers are low in height) shown later in FIGS. 5(a) and 5(b).

Note that, according to the arrangement shown in FIGS. 1(a) and 1(b) or in FIGS. 3(a) and 3(b), it is preferable that the density of distribution of spacers in the non-display region be equal to or smaller than the density of distribution of spacers in the display region. Further, it is assumed here that the second columnar spacers 24 and the first columnar spacers 25 are equal in rigidity to each other. As such, the second columnar spacers 24 and the first columnar spacers 25 may be made of the same material. When the second columnar spacers 24 and the first columnar spacers 25 are made of the same material, the second columnar spacers 24 and the first columnar spacers 25 can be formed at the same time. This enables simplified manufacturing accordingly. The respective shapes of the second columnar spacers 24 and the first columnar spacers 25 can be handled by means of a mask pattern and a modification of an exposure condition. Note that the second columnar spacers 24 and the first columnar spacers 25 can be made of different materials.

Figure 5:
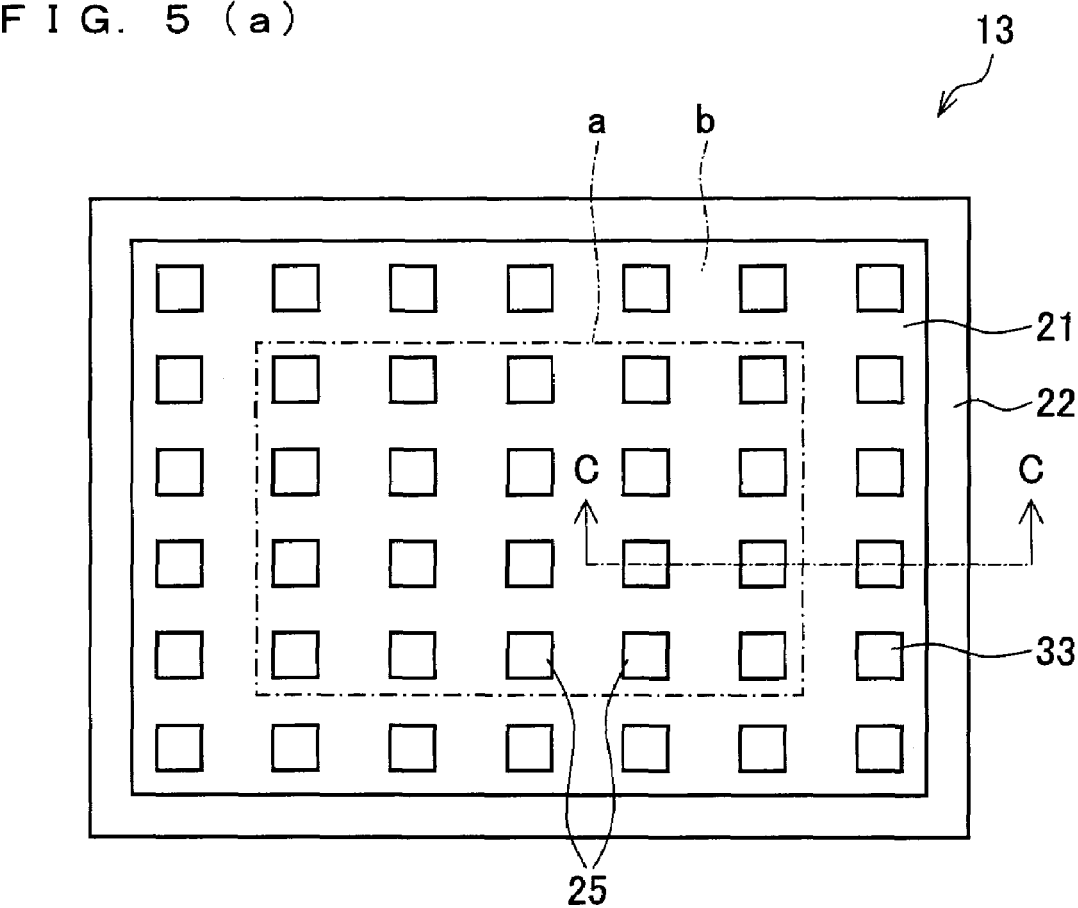
FIG. 5(a) is a plan view showing an example arrangement of a liquid crystal display element according to a preferred embodiment of the present invention.
FIG. 5(b) is a cross-sectional view of the liquid crystal display element of FIG. 5(a) taken along the line C-C.
Figure 5:
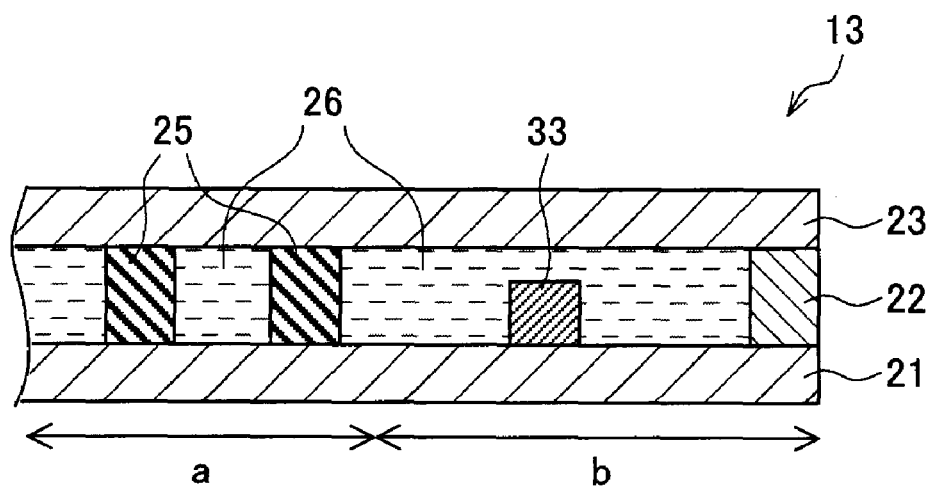

The following shows another example arrangement. As shown in FIGS. 5(a) and 5(b), a liquid crystal display element 13 constituting a panel, as with FIGS. 1(a) and 1(b), includes (i) two substrates (a lower substrate 21 and an upper substrate 23) divided into a display region a and a non-display region b and (ii) first columnar spacers 25, disposed between the two substrates in the display region a, which make contact with the two substrates. Sandwiched between the two substrates are liquid crystals 26, and the liquid crystals 26 are sealed in with sealing material 22.

Furthermore, second columnar spacers 33 are provided in the non-display region. Each of the second columnar spacers 33 has such a height as not to make contact with one of the two substrates (the upper substrate 23 in the figure) when the pair of substrates 21 and 23 are joined to each other. Therefore, as shown in FIG. 6, the non-display region b is more easily concaved than the display region a.

According to the arrangement shown in FIGS. 5(a) and 5(b), even in cases where the level of the base of the non-display region is higher than the level of the base of the display region, the upper surface of each of the second columnar spacers 33 does not make contact with the other one of the two substrates.

That is, the cell gap of the non-display region b is greater than the height of the second columnar spacers 33.

Note that, also in this case, as with the arrangement shown in FIG. 1(a) and 1(b) or in FIGS. 3(a) and 3(b), it is preferable that the density of distribution of spacers in the non-display region be equal to or smaller than the density of distribution of spacers in the display region. Further, it is assumed here that the second columnar spacers 24 and the first columnar spacers 25 are equal in rigidity to each other. As such, the second columnar spacers 24 and the first columnar spacers 25 may be made of the same material. When the second columnar spacers 24 and the first columnar spacers 25 are made of the same material, the second columnar spacers 24 and the first columnar spacers 25 can be formed at the same time. This enables simplified manufacturing accordingly. The respective shapes of the second columnar spacers 24 and the first columnar spacers 25 can be handled by means of a mask pattern and a modification of an exposure condition. Note that the second columnar spacers 24 and the first columnar spacers 25 can be made of different materials.

Figure 7:
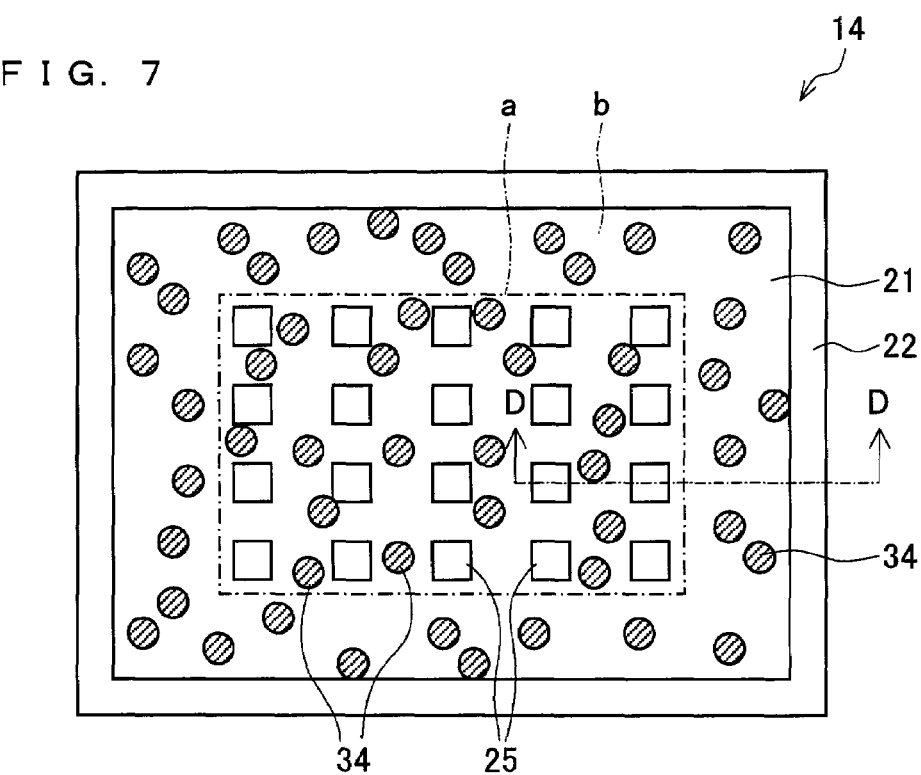
FIG. 7 is a plan view showing an example arrangement of a liquid crystal display element according to a preferred embodiment of the present invention.

The following shows another example arrangement. As shown in FIG. 7, a liquid crystal display element 14 constituting a panel, as with FIGS. 1(a) and 1(b), includes (i) two substrates (a lower substrate 21 and an upper substrate 23) divided into a display region a and a non-display region b and (ii) first columnar spacers 25, disposed between the two substrates in the display region a, which make contact with the two substrates. Sandwiched between the two substrates are liquid crystals 26, and the liquid crystals 26 are sealed in with sealing material 22.

Figure 8:
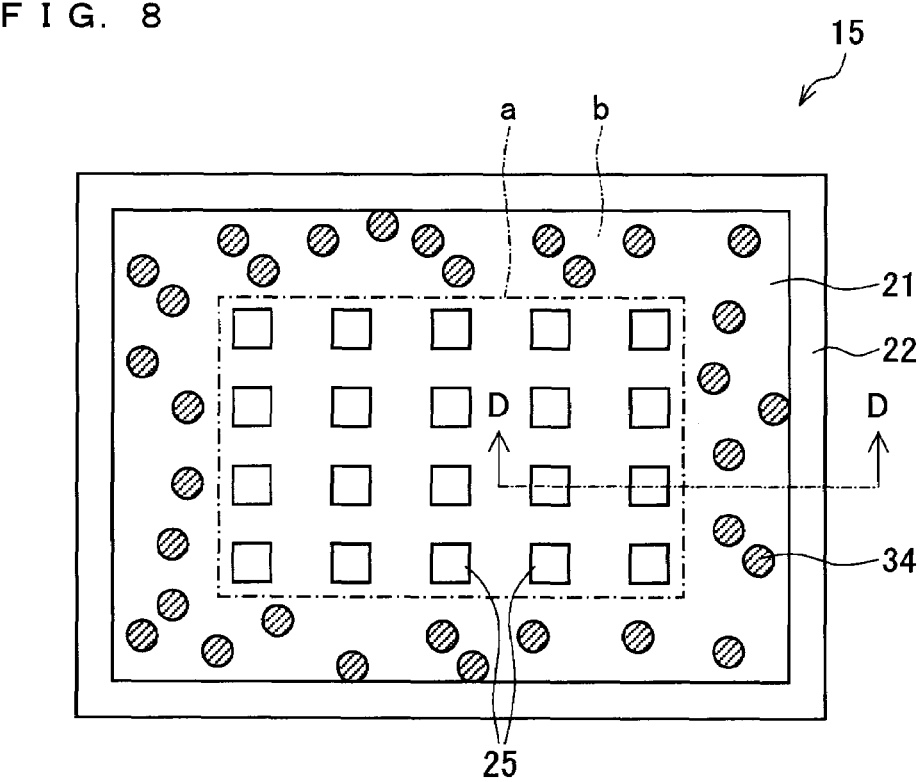
FIG. 8 is a plan view showing an example arrangement of a liquid crystal display element according to a preferred embodiment of the present invention.
Figure 9:
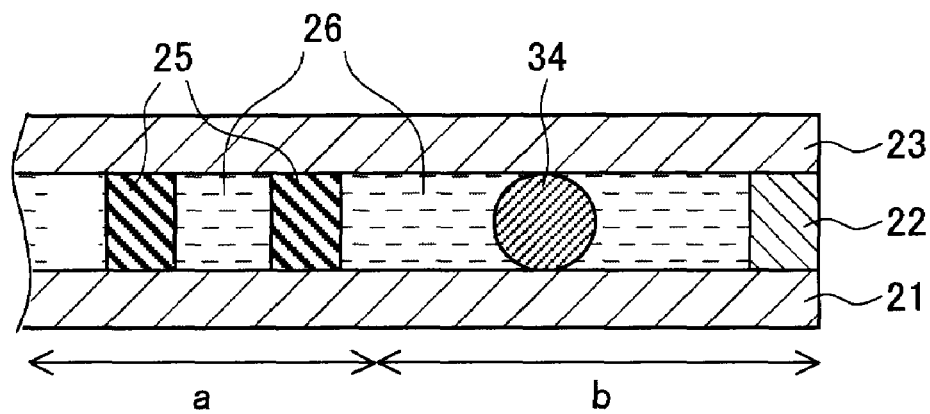
FIG. 9 is a cross-sectional view, taken along the line D-D, which shows how the liquid crystal display element looks like when the non-display region is not concaved.

Furthermore, spherical spacers 34 are provided across the whole substrates of the panel. Alternatively, as shown in FIG. 8, the first columnar spacers 25 are provided in the display region a, and the spherical spacers 34 are provided only in the non-display region b.

Figure 10:
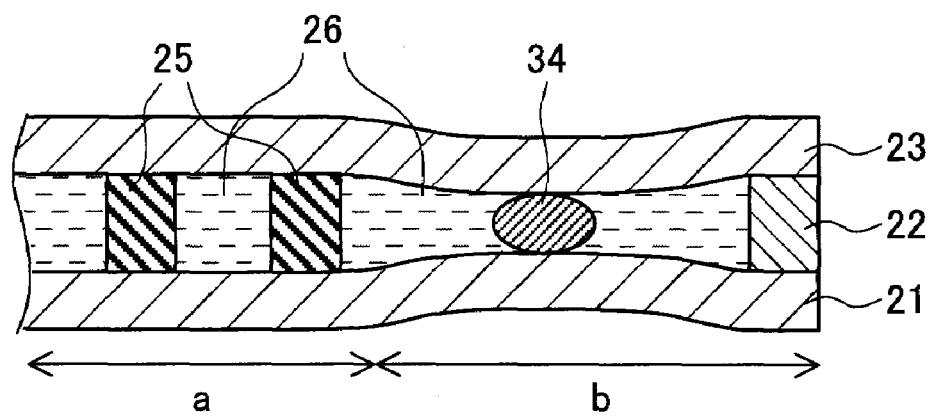
FIG. 10 is a cross-sectional view, taken along the line D-D, which shows how the liquid crystal display element looks like when the non-display region is concaved.

Therefore, in either case, as shown in FIG. 10, the non-display region b is more easily concaved than the display region a.

In each of the arrangements, the spacers are actually disposed very compactly; therefore, it is safe to think that a space between spacers is concaved without the spacers being deformed. The height of the space between the spacers is substantially equal to the height of the spacers. Each of the figures shows that the easily deformable non-display region is concaved (e.g., because the spacers are low in height), and is not intended to show that that a portion of the second columnar spacers is concaved without a space between second columnar spacers being concaved.

The following describes the characteristics of each of the arrangements. Note that the characteristics are common to all the above example arrangements if not otherwise specified. When a temperature drop or a substrate deformation is caused in the display region, the substrates in the non-display region are concaved, so that the liquid crystals move into the display region by the capacity by which the non-display region was concaved. As a result, the display region can be filled with the liquid crystals, so that the volume of the liquid crystals and the capacity of the panel become equal to each other. This makes it possible to prevent vacuum bubbles from being generated in the display region. Therefore, even in case of a temperature drop or a substrate deformation, the reliability of the panel can be prevented from being degraded due to vacuum bubbles. This makes it possible to prevent the cell gap in the display region from being changed, thereby making it possible to prevent display quality from being degraded.

Figure 11:
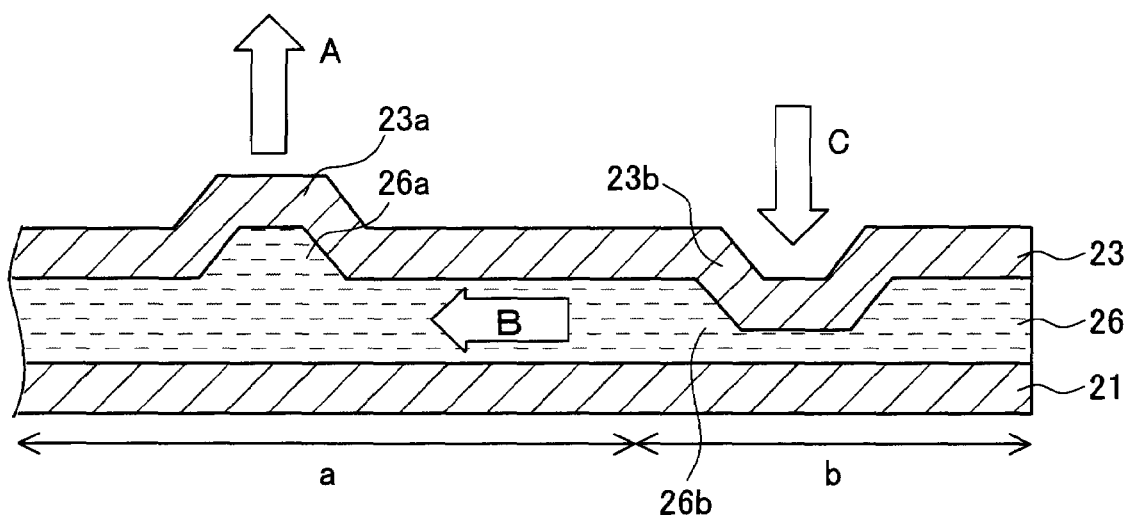
FIG. 11 is a cross-sectional view showing how the liquid crystals move when the non-display region is concaved.

A case where a larger substrate deformation is required, e.g., a case where one of the substrates is pulled outward can be handled. For example, as shown in FIG. 11, in cases where the substrate 23 in the display region a is deformed by being pulled outward, that portion of the substrate 23, i.e., a region 23a sticks out. Then, liquid crystals 26b in the non-display region b move into a region 26a of the display region a so as to fill the space created when the substrate 23 was pulled. Accordingly, the non-display region b, i.e., a region 23b is concaved, so that no bubbles are generated in the non-display region b. This makes it possible to also prevent "generation of bubbles due to the inability of the volume of liquid crystals to keep pace (increase)".

COMPARATIVE EXAMPLE

In this example, a liquid crystal display element is prepared by using at least one substrate made of (i) plastic such as PES, PET, or polyimide, (ii) complex plastic obtained by combining, with plastic material, (a) fiber such as carbon or glass or (b) filler, or (iii) metal such as stainless steel. One of the substrates has a surface on which TFT elements, color filters, pixel electrodes, and columnar spacers are provided. The other one of the substrates is provided with opposing electrodes.

The structure of each substrate is not limited to this. For example, the color filters, the columnar spacers, and the like may be provided on the opposing substrate.

Figure 12:
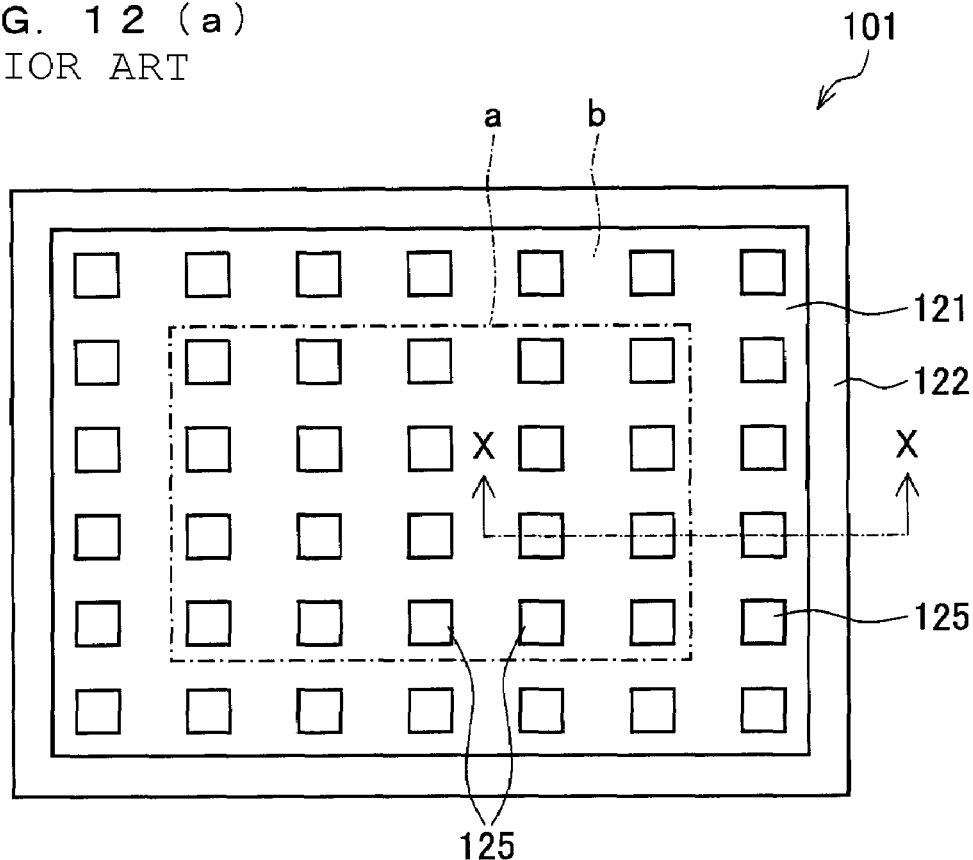
FIG. 12(a) is a plan view showing an example arrangement of a conventional liquid crystal display element.
FIG. 12(b) is cross-sectional view of the conventional liquid crystal display element of FIG. 12(a) taken along the line X-X.
Figure 12:
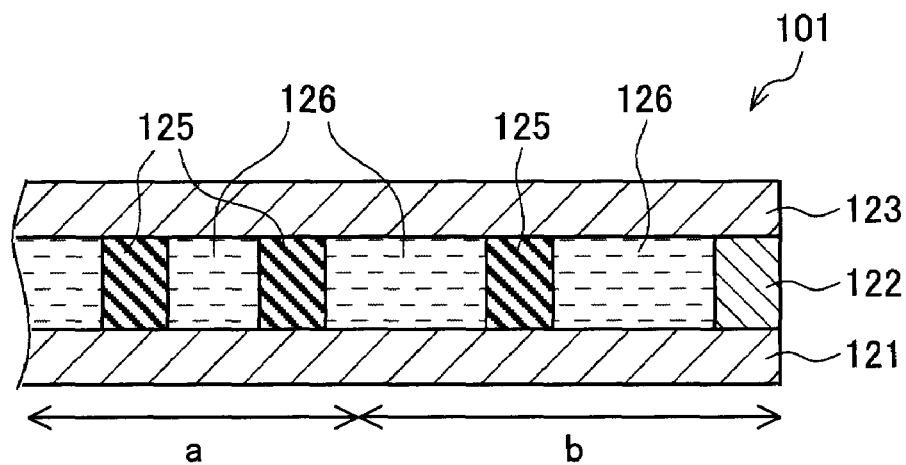

As shown in FIGS. 12(a) and 12(b), the columnar spacers are provided across the whole panel so as to be each positioned in a black matrix portion of each pixel and so as to be each in the shape of an angular column having a height of 4.5 μm and an area of base of 10×20 μm. The height of the columnar spacers is determined by the needed cell gap, and the area and density of the columnar spacers are determined in accordance with substrate hardness and spacer elasticity so that the needed panel strength (needed degree of resistance to pressure) is obtained. The total area of the spacers is determined in this manner, and is usually not less than 0.5% per unit area. When it is not necessary to consider substrate deformation that is due to local external pressure, a uniform cell gap can be realized as long as the total area of the spacers is not less than 0.1%. However, in order to achieve such strength that external pressure such as pen-based input or the like are sufficiently withstood, the total area of the spacers may need to be not less than 0.8%.

The pair of substrates each have a surface on which an orientation film is provided, are subjected to orientation treatment by means of rubbing (this is unnecessary in some liquid crystal modes), and are cleaned (this may be unnecessary unless rubbing is performed). Thereafter, the pair of substrates are joined to each other so as to face each other, and liquid crystals are injected in vacuum. In order to obtain a uniform display by correcting a deformation of the substrates (a bulge in the cell gap), it is preferable that the liquid crystals thus injected be sealed in under pressure.

Further, the liquid crystals may be filled by means of one drop filling (ODF). In such a case, the amount of liquid crystals to be dropped is determined by the volume calculated according to the height of a columnar spacer and the internal area of a cell. Plastic substrates usually have warpage and undulation to some extent. Therefore, the seal is hardened with the substrates pressed under pressure so as to be sufficiently flat at the height of the first columnar spacers and spacers mixed in the seal.

The seal is made of UV (ultraviolet) sealing material, and is hardened when irradiated with UV light at 2 J/cm2.

When the liquid crystal panel thus prepared is left in a low-temperature bath at −30° C., the volume of the liquid crystals is reduced due to a temperature drop. However, the columnar spacers prevent a deformation of the substrates across the whole panel. Therefore, the panel capacity cannot keep pace with the reduction in the volume of the liquid crystals, so that vacuum bubbles are generated.

EXAMPLE 1

In this example, the first columnar spacers are provided across the whole panel so as to be each positioned in a black matrix portion of each pixel and so as to be each in the shape of an angular column having a height of 4.5 μm and an area of base of 10×20 μm. The height of the first columnar spacers is determined by the needed cell gap, and the area and density of the first columnar spacers are determined in accordance with substrate hardness and spacer elasticity so that the needed panel strength (needed degree of resistance to pressure) is obtained. The total area of the spacers is determined in this manner, and is usually not less than 0.5% per unit area. When it is not necessary to consider substrate deformation that is due to local external pressure, a uniform cell gap can be realized as long as the total area of the spacers is not less than 0.11%. However, in order to achieve such strength that external pressure such as pen-based input or the like are sufficiently withstood, the total area of the spacers may need to be not less than 0.8%.

Furthermore, in this example, as shown in FIGS. 1(a) and 1(b) or in FIGS. 3(a) and 3(b), the second columnar spacers are provided in the non-display region. Each of the spacers provided in the non-display region makes contact with the substrates by a contact area smaller than a contact area by which each of the spacers provided in the display region makes contact with the substrates. With this, the structure is such that the substrates are easily deformed (the gap between the substrates is easily narrowed). Each of the second spacers is in the shape of an angular column as with each of the first spacers. The second spacer is shaped so as to have a smaller area of base than the first spacer does (see FIGS. 1(a) and 1(b)). Alternatively, each of the second spacers is shaped differently from each of the first spacers into a dome, a pyramid, or the like so as to have the same area of base as the first spacer does and to have a smaller upper-surface area than the first spacer does. Such shapes as a dome and a pyramid can be formed in diverse ways, e.g., by exposing the non-display region to diffusion light with use of a negative resist in forming the columnar spacers.

In this example, each of the second columnar spacers has a small area of base, and is in the shape of an angular column of 5×5 μm. The first columnar spacers are disposed so as to occupy 0.8% of the area of the display region. The second columnar spacers are disposed so as to occupy not more than 0.3% of the area of the non-display region. In this example, the second columnar spacers were disposed so as to occupy 0.1% of the area of the non-display region.

When the liquid crystal panel thus prepared is left in a low-temperature bath at −30° C., the volume of the liquid crystals is reduced due to a temperature drop. However, the substrates are deformed in that portion of the non-display region which has columnar spacers each having a small area of base, so that bubbles can be prevented from being generated.

EXAMPLE 2

In this example, the first columnar spacers are provided across the whole panel so as to be each positioned in a black matrix portion of each pixel and so as to be each in the shape of an angular column having a height of 4.5 μm and an area of base of 10×20 μm. The height of the first columnar spacers is determined by the needed cell gap, and the area and density of the first columnar spacers are determined in accordance with substrate hardness and spacer elasticity so that the needed panel strength (needed degree of resistance to pressure) is obtained. The total area of the spacers is determined in this manner, and is usually not less than 0.5% per unit area. When it is not necessary to consider substrate deformation that is due to local external pressure, a uniform cell gap can be realized as long as the total area of the spacers is not less than 0.1%. However, in order to achieve such strength that external pressure such as pen-based input or the like are sufficiently withstood, the total area of the spacers may need to be not less than 0.8%.

Furthermore, in this example, as shown in FIGS. 5(a) and 5(b), the second columnar spacers are provided in the non-display region. The second columnar spacers are low in height, and are structured so that, when a pair of substrates are joined to each other, an upper surface of each of the second columnar spacers does not make contact with one of the substrates. With this, the structure is such that the substrates are more easily deformed in the non-display region than in the display region (the gap between the substrates is easily narrowed).

The height of the first columnar spacers corresponds to the value of a predetermined cell gap. The height of the second columnar spacers is preferably greater than 1.5 μm. The reason for this is as follows: When the height of the second columnar spacers is less than 1.5 μm, there is a possibility that exhaust speed and injection speed become low during vacuum injection. Further, the height of the second columnar spacers is preferably such that the second columnar spacers are at a distance of not less than 0.3 μm from one of the substrates in such a state that the cell gap across the whole panel reaches a predetermined value due to the first columnar spacers and spacers provided in the seal. The reason for this is as follows: Even a slight distance has an effect on bubbles that are generated at low temperatures; however, a case where a larger substrate deformation is required, e.g., a case where one of the substrates is pulled outward cannot be handled.

When the liquid crystal panel thus prepared is left in a low-temperature bath at −30° C., the volume of the liquid crystals is reduced due to a temperature drop. However, the substrates are deformed in that portion of the non-display region in which no columnar spacers are provided, so that bubbles can be prevented from being generated.

EXAMPLE 3

In this example, the first columnar spacers are provided across the whole panel so as to be each positioned in a black matrix portion of each pixel and so as to be each in the shape of an angular column having a height of 4.5 μm and an area of base of 10×20 μm. The height of the first columnar spacers is determined by the needed cell gap, and the area and density of the first columnar spacers are determined in accordance with substrate hardness and spacer elasticity so that the needed panel strength (needed degree of resistance to pressure) is obtained. The total area of the spacers is determined in this manner, and is usually not less than 0.5% per unit area. When it is not necessary to consider a substrate deformation that is due to local external pressure, a uniform cell gap can be realized as long as the total area of the spacers is not less than 0.1%. However, in order to achieve such strength that external pressure such as pen-based input or the like are sufficiently withstood, the total area of the spacers may need to be not less than 0.8%.

Furthermore, in this example, as shown in FIG. 7 or in FIG. 8, the spherical spacers are provided in the non-display region. The spherical spacers are more easily deformed than the first columnar spacers.

The spherical spacers may be provided only in the non-display region, or may be provided both in the display region and the non-display region.

When the liquid crystal panel thus prepared is left in a low-temperature bath at −30° C., the volume of the liquid crystals is reduced due to a temperature drop. However, the substrates are deformed in that portion of the non-display region in which the spherical spacers are provided, so that bubbles can be prevented from being generated.

The present invention is not limited to the description of the preferred embodiments above, but may be altered by a skilled person within the scope of the claims. An embodiment based on a proper combination of technical means disclosed in different preferred embodiments is encompassed in the technical scope of the present invention.

Note that a liquid crystal display element according to the present invention may be arranged so as to have (i) first columnar spacers provided in a display region and (ii) second columnar spacers provided in a non-display region, each of the second columnar spacers making contact with one of a pair of substrates by a contact area smaller than a contact area by which each of the first columnar spacers makes contact with that substrate.

Further, a liquid crystal display element according to the present invention may be arranged so as to have (i) first columnar spacers provided in a display region and (ii) second columnar spacers provided in a non-display region, with a pair of substrates joined to each other, the first columnar spacers making contact with the two substrates, the second columnar spacers making contact with only one of the two substrates.

Further, a liquid crystal display element according to the present invention may be arranged so as to have (i) first columnar spacers provided in a display region and (ii) spherical spacers provided at least in a non-display region.

Thus, a liquid crystal display element of the present invention has first columnar spacers provided in a display region of a liquid crystal panel manufacture with the use of flexible substrates, thereby realizing a uniform display with a predetermined cell gap, and has (i) no spacers, (ii) second columnar spacers, or (iii) spherical spacers provided in a non-display region other than the display region. With this, that portion of the substrates which is outside of the display region becomes easily deformable. This makes it possible to prevent vacuum bubbles from being generated in response to a change in the volume of liquid crystals or a change in cell capacity due to external pressure.

As described above, a liquid crystal display element according to the present invention is arranged so as to include second columnar spacers, disposed between the two substrates in the non-display region, which make contact with the two substrates by a contact area smaller than a contact area by which the first columnar spacers make contact with the two substrates.

Further, in addition to the foregoing arrangement, the liquid crystal display element according to the present invention may be arranged such that each of the second columnar spacers is disposed between the two substrates in the non-display region so that a contact area by which the second columnar spacer makes contact with one of the two substrates is smaller than a contact area by which the second columnar spacer makes contact with the other one of the two substrates.

Further, a liquid crystal display element according to the present invention is arranged so as to include second columnar spacers, disposed between the two substrates in the non-display region, which make contact with only one of the two substrates.

Further, a liquid crystal display element according to the present invention is arranged so as to include spherical spacers, disposed between the two substrates in the non-display region, which make contact with the two substrates.

With this, when a temperature drop or a substrate deformation is caused in the display region, the non-display region of the substrates is concaved, so that the liquid crystal moves into the display region by the capacity by which the non-display region was concaved. As a result, the display region can be filled with the liquid crystals. This makes it possible to prevent vacuum bubbles from being generated in the display region. This brings about an effect of making it possible to, even in case of a temperature drop or a substrate deformation, prevent the reliability of a panel from being degraded due to vacuum bubbles.

Further, in addition to the foregoing arrangement, the liquid crystal display element according to the present invention is characterized in that the first columnar spacers and the second columnar spacers are equal in rigidity to each other.

According to the foregoing arrangement, the first columnar spacers and the second columnar spacers are equal in rigidity to each other. Therefore, the first columnar spacers and the second columnar spacers may be made of the same material. This makes it possible to form the first columnar spacers and the second columnar spacers at the same time. This brings about an effect of enabling simplified manufacturing.

The preferred embodiments and concrete examples of implementation discussed in the foregoing detailed explanation serve solely to illustrate the technical details of the present invention, which should not be narrowly interpreted within the limits of such preferred embodiments and concrete examples, but rather may be applied in many variations within the spirit of the present invention, provided such variations do not exceed the scope of the patent claims set forth below.

The present invention can be applied, for example, to an image display apparatus that displays an image with use of liquid crystals.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display element comprising:
two substrates, divided into a display area and a non-display area, between which liquid crystals are sandwiched;
first columnar spacers disposed between the two substrates in the display region and arranged to make contact with the two substrates; and
second columnar spacers disposed between the two substrates in the non-display region and arranged to make contact with the two substrates; wherein
a contact area in which each of the second columnar spacers makes contact with the two substrates is smaller than a contact area in which each of the first columnar spacers makes contact with the two substrates.

2. The liquid crystal display element as set forth in claim 1, wherein each of the second columnar spacers is disposed between the two substrates in the non-display region so that a contact area in which the second columnar spacer makes contact with one of the two substrates is smaller than a contact area in which the second columnar spacer makes contact with the other one of the two substrates.

3. The liquid crystal display element as set forth in claim 1, wherein the first columnar spacers and the second columnar spacers are equal in rigidity to each other.

4. The liquid crystal display element as set forth in claim 2, wherein the first columnar spacers and the second columnar spacers are equal in rigidity to each other.

5. A liquid crystal display element comprising:
two substrates, divided into a display area and a non-display area, between which liquid crystals are sandwiched;
first columnar spacers disposed between the two substrates in the display region and arranged to make contact with the two substrates; and
second columnar spacers disposed between the two substrates in the non-display region and arranged to make contact with the two substrates with a contact area smaller than a contact area in which the first columnar spacers make contact with the two substrates; wherein
a contact area in which the second columnar spacers make contact with one of the two substrates is smaller than a contact area in which the second columnar spacers make contact with the other one of the two substrates.

6. The liquid crystal display element as set forth in claim 5, wherein the first columnar spacers and the second columnar spacers have the same rigidity.

7. A liquid crystal display element comprising:
two substrates, divided into a display area and a non-display area, between which liquid crystals are sandwiched;
first columnar spacers disposed between the two substrates in the display region and arranged to make contact with the two substrates; and
second columnar spacers disposed between the two substrates in the non-display region and arranged to make contact with the two substrates with a contact area smaller than a contact area in which the first columnar spacers make contact with the two substrates; wherein
the first columnar spacers and the second columnar spacers have the same rigidity.

* * * * *